(12) United States Patent
Calmettes et al.

(10) Patent No.: US 10,054,449 B2
(45) Date of Patent: Aug. 21, 2018

(54) METHOD OF FOLLOWING A TRANSFER ORBIT OR A PHASE OF ORBITAL PLACEMENT OF A SPACE VEHICLE, IN PARTICULAR AN ELECTRIC PROPULSION VEHICLE, AND APPARATUS FOR THE IMPLEMENTATION OF SUCH A METHOD

(71) Applicant: THALES, Courbevoie (FR)

(72) Inventors: Thibaud Calmettes, Toulouse (FR);
Fabien Rozo-Quillere, Toulouse (FR);
Damien Serant, Toulouse (FR)

(73) Assignee: THALES, Courbevoie (FR)

( * ) Notice: Subject to any disclaimer, the term of this patent is extended or adjusted under 35 U.S.C. 154(b) by 553 days.

(21) Appl. No.: 14/633,512

(22) Filed: Feb. 27, 2015

(65) Prior Publication Data
US 2015/0247730 A1  Sep. 3, 2015

(30) Foreign Application Priority Data

Feb. 28, 2014  (FR) .................................... 14 00508

(51) Int. Cl.
| | |
|---|---|
| *B64G 1/00* | (2006.01) |
| *B64G 1/24* | (2006.01) |
| *B64G 1/28* | (2006.01) |
| *G01C 21/24* | (2006.01) |
| *G01S 19/05* | (2010.01) |
| *G01S 19/10* | (2010.01) |
| *G01S 19/14* | (2010.01) |

(52) U.S. Cl.
CPC ............. *G01C 21/24* (2013.01); *B64G 1/007* (2013.01); *G01S 19/05* (2013.01); *G01S 19/10* (2013.01); *G01S 19/14* (2013.01)

(58) Field of Classification Search
CPC ......... B64G 1/007; G01C 21/24; G01S 19/05; G01S 19/10; G01S 19/14; G05D 1/0883
USPC .......................................................... 701/468
See application file for complete search history.

(56) References Cited

U.S. PATENT DOCUMENTS

| | | | | |
|---|---|---|---|---|
| 5,716,029 | A * | 2/1998 | Spitzer ................... | B64G 1/007 244/158.5 |
| 6,845,950 | B1 * | 1/2005 | Goodzeit ............... | B64G 1/007 244/158.6 |
| 6,859,170 | B2 | 2/2005 | Devereux et al. | |
| 6,882,908 | B2 | 4/2005 | Laurichesse | |
| 2005/0258311 | A1 * | 11/2005 | Scott ....................... | B64G 1/007 244/172.4 |
| 2010/0211316 | A1 * | 8/2010 | Da Silva ................. | G01S 19/47 701/472 |

(Continued)

*Primary Examiner* — Charles J Han
(74) *Attorney, Agent, or Firm* — Baker & Hostetler LLP (57) ABSTRACT

A method of following a transfer orbit or a phase of orbital placement of a continuous-thrust space vehicle comprises the following steps: a) tracking at least one GNSS signal and using it to determine at least one pseudorange between the space vehicle and one or more GNSS satellites transmitting the signal; b) using an estimation model to jointly estimate a set of state parameters of the space vehicle comprising a plurality of position parameters, a plurality of velocity parameters and at least one thrust error parameter characterizing a discrepancy between an actual thrust force of the space vehicle and a nominal thrust force by taking the pseudorange or pseudoranges as input datum of the estimation model. An apparatus for the implementation of such a method is also provided.

26 Claims, 3 Drawing Sheets

(56) References Cited

U.S. PATENT DOCUMENTS

2011/0254734 A1\* 10/2011 Li ........................... G01S 19/14
 342/357.77

\* cited by examiner

METHOD OF FOLLOWING A TRANSFER ORBIT OR A PHASE OF ORBITAL PLACEMENT OF A SPACE VEHICLE, IN PARTICULAR AN ELECTRIC PROPULSION VEHICLE, AND APPARATUS FOR THE IMPLEMENTATION OF SUCH A METHOD

CROSS-REFERENCE TO RELATED APPLICATION

This application claims priority to foreign French patent application No. FR 1400508, filed on Feb. 28, 2014, the disclosure of which is incorporated by reference in its entirety.

FIELD OF THE INVENTION

The invention pertains to a method of following a space vehicle orbit by means of a satellite navigation system (GNSS, standing for "Global Navigation Satellite System") of GPS, Galileo or GLONASS type, as well as to an apparatus for the implementation of such a method. The invention applies more particularly to the following of a transfer orbit—notably towards a geostationary orbit—or of a phase of orbital placement of a space vehicle, notably when the latter uses electric propulsion.

BACKGROUND

Satellite navigation systems have been designed to allow the location and the following of trajectories of users on the ground, or at the very most of aircraft flying at low altitude. However, it is also known to use them to follow the orbit of space vehicles, mainly in low orbit (LEO, standing for "Low Earth Orbit"), much more rarely in the case of intermediate orbits (MEO, standing for "Medium Earth Orbit") or geostationary orbits (GEO). However, these systems have not been used hitherto to follow the transfer or orbital placement phases, since the usage constraints are strong: the GNSS signal is generally weak since these orbits are outside the main lobes of the transmitting antennas of the GNSS satellites (which are logically pointed towards the earth); there are significant periods of non-availability; the activation of the propulsion gives rise to significant location errors and prevents recourse to the simplifying assumption according to which the vehicle follows a Keplerian orbit, etc. These constraints are still more significant in the case of space vehicles employing electric propulsion (emission of ions, for example), wherein the thrust is continuous over the whole of the duration of the transfer phase.

For these reasons, orbital positioning in the course of transfer is carried out by virtue of measurements of distance on a TMTC communication channel between the space vehicle and terrestrial stations. This solution exhibits numerous drawbacks: need to use several ground stations to have sufficient geometric diversity, thus giving rise to significant cost; location inaccuracy; lag between the measurements which entails large drifts; low autonomy in case of degradation of the communication link.

The invention is aimed at remedying the aforementioned drawbacks of the prior art. More particularly, it is aimed at enabling GNSS following of the transfer orbits and phases of orbital placement of space vehicles, notably using continuous thrust and more particularly electric propulsion.

In accordance with the invention, such an aim is achieved by virtue of tight coupling between a GNSS processing and a model for estimating a state vector of the space vehicle taking into account the propulsion of the latter.

SUMMARY OF THE INVENTION

Thus, a subject of the invention is a method of following a transfer orbit or a phase of orbital placement of a space vehicle comprising the following steps:

a) tracking at least one GNSS signal and using it to determine at least one pseudorange between the said space vehicle and one or more GNSS satellites transmitting the said or each said signal;

b) using an estimation model to jointly estimate a set of state parameters of the said space vehicle comprising a plurality of position parameters, a plurality of velocity parameters, at least one clock parameter, and at least one thrust error parameter characterizing a discrepancy between an actual thrust force of the said space vehicle and a nominal thrust force, by taking the said pseudorange or pseudoranges as input datum of the said estimation model.

According to particular embodiments of such a method:

The said thrust can be a continuous thrust, notably of electric type.

The said step a) can comprise the recovery by assistance from the ground of the navigation message of the GNSS satellite or of each navigation message of each GNSS satellite.

The said step a) can comprise the tracking of at least one pilot GNSS signal, not transporting any navigation message, the said tracking being carried out by coherent correlation of the said or of each said pilot GNSS signal over a duration greater than that of a symbol.

As a variant, the said step a) can comprise an operation of erasing the said or each said navigation message recovered by assistance from the ground so as to allow the said coherent correlation.

The said set of state parameters can comprise at least one first thrust error parameter characterizing a discrepancy between an amplitude of the said actual thrust force and of the said nominal thrust force, and a second thrust error parameter characterizing a discrepancy between a direction of the said actual thrust force and of the said nominal thrust force.

More particularly, the said set of state parameters can comprise at least two thrust error parameters characterizing at one and the same time the said discrepancy between a direction of the said actual thrust force and of the said nominal thrust force, and an error of estimation of the attitude of the said space vehicle.

More particularly still, the method can also comprise the following step:

c) applying, for a determined duration, a thrust nominally directed along a direction linking the said space vehicle to a GNSS satellite transmitting a GNSS signal acquired during the said step a);

whereby the application of the said estimation model allows an improvement in the estimation of the said thrust error parameters or of at least one of the said thrust error parameters.

The said set of state parameters can also comprise at least one clock error parameter, characterizing an offset or a drift of a clock of a GNSS receiver onboard the said space vehicle and used to implement the said step a).

The said estimation model can be a Kalman filter or an extended Kalman filter characterized by a transition matrix or function depending on time and on the position of the said space vehicle so as to take into account the gravitational forces acting on the said space vehicle and also the said thrust force.

The method can also comprise the following step:

d) using pseudoranges measured in the past, as well as the corresponding estimations of the said state parameters, to update a covariance matrix of the said estimation model.

The method can also comprise the following step:

e) using the said or at least one said GNSS signal acquired, a knowledge of the ephemerides of the GNSS satellite that transmitted it and the space vehicle's position estimated by means of the said estimation model to estimate a radiation pattern of a transmitting antenna of the said GNSS satellite.

The method can also comprise the following step:

f) using the said or at least one said estimation of a radiation pattern during the implementation of the said step a).

The method can also comprise the following step:

g) using the knowledge of the said estimation model and of the said state parameters to determine future corrections of the orbit and/or of the thrust of the said space vehicle.

Another subject of the invention is an apparatus for the implementation of such a method comprising:

a GNSS receiver configured to track at least one GNSS signal;

a device for processing the data receiving as input a GNSS signal tracked by the said receiver;

the said processing device being configured or programmed to:

use the said or each said GNSS signal acquired to determine at least one pseudorange between the said receiver and one or more GNSS satellites transmitting the said or each said signal;

apply an estimation model to jointly estimate a set of state parameters comprising a plurality of position parameters, a plurality of velocity parameters, at least one clock parameter, and at least one thrust error parameter characterizing a discrepancy between an actual thrust force of the said space vehicle and a nominal thrust force, by taking the said pseudorange or pseudoranges as input datum of the said estimation model.

BRIEF DESCRIPTION OF THE DRAWINGS

Other characteristics, details and advantages of the invention will emerge on reading the description afforded with reference to the appended drawings given by way of example and in which.

DETAILED DESCRIPTION

Figure 1:
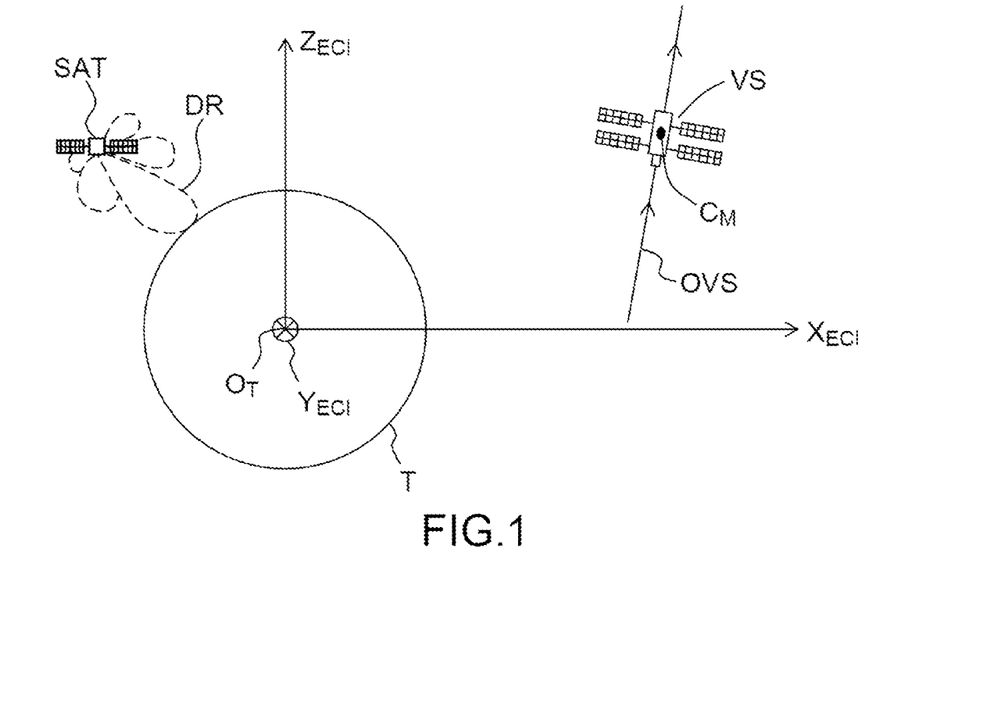
FIG. 1 shows a space vehicle, a transfer orbit of which is followed by a method according to the invention, as well as a GNSS satellite used for the implementation of this method.

FIG. 1 illustrates a configuration in which the present invention can be advantageously implemented. In this figure the reference T corresponds to the Earth and $O_T$ to its centre serving as origin for the ECI ("Earth-Centred Inertial") frame of reference whose, mutually orthogonal, axes are $X_{ECI}$, $Y_{ECI}$ and $Z_{ECI}$. A satellite SAT in low orbit, belonging to a GNSS constellation, transmits a positioning signal by means of an antenna exhibiting a radiation pattern DR whose main lobe is directed towards the earth. The space vehicle VS moves on a transfer orbit OVS at a greater altitude than that of the satellite SAT. The orbit OVS is not Keplerian, since the propulsion—for example electric—of the space vehicle is activated; furthermore, the navigation signal is received with a low signal-to-noise ratio since only a sidelobe of the radiation pattern DR can be picked up by a receiving antenna of the space vehicle VS. The figure illustrates a single GNSS satellite SAT, but it must be understood that in general several of them may be in conditions of visibility from the space vehicle VS.

Figure 2:
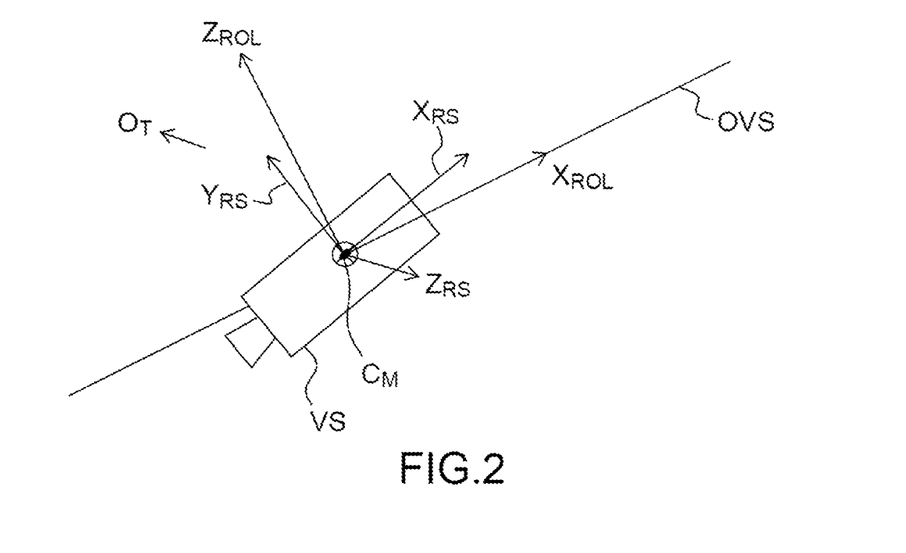
FIG. 2 illustrates the relation existing between a local orbital frame and a satellite frame.

FIG. 2 schematically represents the space vehicle VS and two frames of reference centred on its centre of mass $c_M$, which moves along the trajectory OVS. The mutually orthogonal axes $X_{ROL}$, $Y_{ROL}$ and $Z_{ROL}$ form the "orbital frame"; conventionally one chooses $X_{ROL}$ oriented along the velocity axis and $Z_{ROL}$ such that the centre of the Earth $O_T$ is in the plane ($X_{ROL}$, $c_M$, $Z_{ROL}$). The mutually orthogonal axes $X_{RS}$, $Y_{RS}$ and $Z_{RS}$ form the "satellite frame", tied physically to the space vehicle VS. Conventionally $X_{RS}$ is chosen opposite to the axis of the nozzle, such that the thrust occurs in a direction $X_{RS}$.

The attitude of the space vehicle is the rotation between the two frames ($X_{ROL}$, $Y_{ROL}$, $Z_{ROL}$) and ($X_{RS}$, $Y_{RS}$, $Z_{RS}$). Conventionally, it can be defined by three Euler angles or by quaternions.

Figure 3:
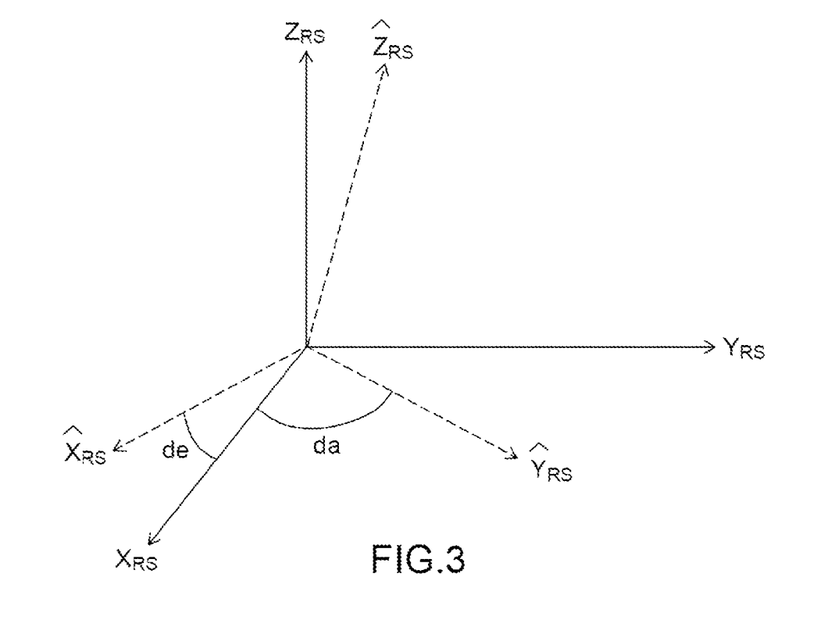
FIG. 3 illustrates the notion of attitude error.

The attitude is generally estimated by procedures such as the use of star trackers or the consideration of the history of the rotations of the attitude control wheels. This estimation inevitably exhibits an error ("attitude error"), the consideration of which constitutes a significant aspect of the present invention. The attitude error can be defined by the error between the "true" axis $X_{RS}$ and the "estimated" axis $\hat{X}_{RS}$. This error is a rotation, defined in general by three angles; however, as it is generally small, it can be described by two angles only (elevation offset de, azimuth offset da):

The relation between the true satellite frame ($X_{RS}$, $Y_{RS}$, $Z_{RS}$) and the estimated satellite frame ($\hat{X}_{RS}$, $\hat{Y}_{RS}$, $\hat{Z}_{RS}$) is illustrated in FIG. 3.

Figure 4:
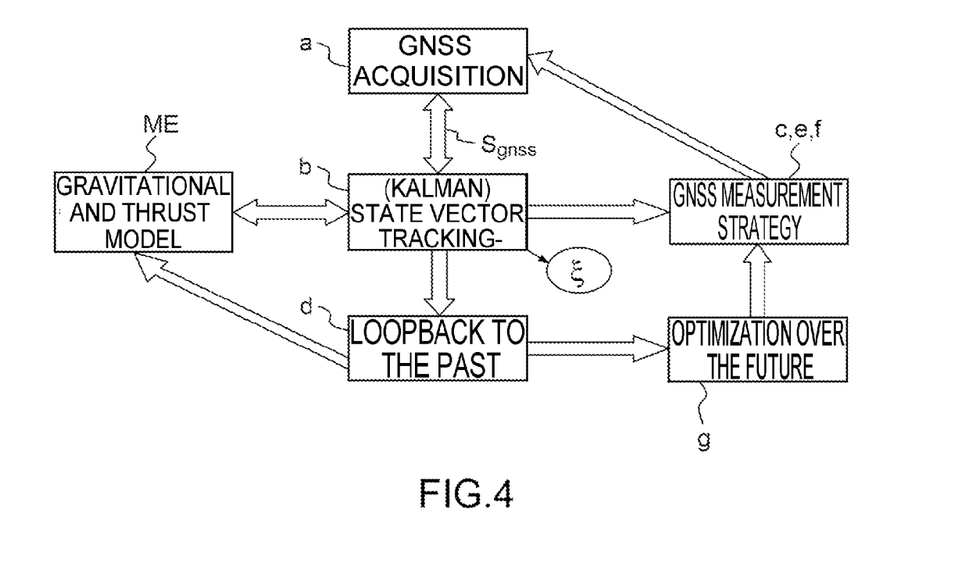
FIG. 4 is a diagram of a method according to an embodiment of the invention.

FIG. 4 schematically illustrates an orbit following method, which will be described in detail hereinafter.

The first step (a) of such a method is the acquisition of one or more GNSS signals and their use to determine one or more pseudoranges.

GNSS signals are spread spectrum signals of CDMA ("Code Division Multiple Access") type, consisting of a useful binary content (navigation message) multiplied by a spreading code. The spreading code is repeated with a periodicity equal to the duration of a symbol, with a positive or negative sign according to the value of the said symbol. Within the framework of the use of GNSS for navigation in high orbits one works at low signal-to-noise ratio and it therefore becomes particularly beneficial to consider, among the signals, solely the pilot pathways, that is to say the pathways for which the useful binary content is fixed (symbols identically equal to zero or to one). Thus, it is possible to integrate the signal in a coherent manner over a longer length than the duration of the useful symbol. With the exception of the L1 pathway in GPS, all the GPS and Galileo (as well as GLONASS and Compass) signals always consist of a pilot pathway and of a modulated-data pathway, so that this constraint of pilot usage does not give rise to any frequency limitation (except as regards the L1 pathway of GPS). On the other hand, the information transported by the navigation signal—and notably the long-term ephemerides of the GNSS satellites—must be recovered by another means, typically, from a ground station. As a variant, it is possible to use the navigation signal thus recovered to "remove" the binary symbols of a pilot pathway, and transform the latter into a pilot pathway ("data wipe-off").

The use of a lone pilot pathway makes it possible to perform a measurement of pseudorange which is ambiguous at the period of the code. Indeed, all the symbols being the same, it is possible to date the start of a symbol but it is not possible to say a priori what symbol is involved. According to the band used, this ambiguity lies between 1 ms (300 km in distance) and 4 ms (1200 km). Such distances are large enough for allowing fast ambiguity removal in ground applications, but they can be fairly easily achieved within the framework of orbital propagation, having regard to the possibility of encountering long periods (several hours) with no possibility of measurement.

In accordance with the invention, this ambiguity is resolved by virtue of the use of a model for estimating the thrust of the space vehicle. This model can advantageously be integrated into a model for estimating a state vector including, in addition to parameters characterizing the thrust, the position and the velocity of the space vehicle.

Furthermore, the integration of the thrust in the estimated state vector makes it possible to improve the continuous knowledge of the position of the receiver, including in the phases of pure propagation where the GNSS satellites are not visible, or hardly visible. It is then relevant to consider so-called "tight" integration of the GNSS measurements in the processing. Indeed, within the framework of "slack" functioning, the pseudorange measurements of the GNSS processing are carried out in an independent manner, and thereafter sent to the navigation function which is in charge of taking them into account in the trajectory tracking. Within the framework of "tight" functioning, the navigation function provides the GNSS processing with the estimated position of the receiver. By combining this estimated position of the receiver with the estimated position of the GNSS satellites, the GNSS processing can anticipate the frequencies and synchronization of receptions of the GNSS signals, thus very greatly easing its functioning and improving in particular its capacity to function at low signal-to-noise ratio.

Advantageously, in an embodiment of the invention the state vector (reference $\xi$ in FIG. 4) is estimated by Kalman filtering (block b) with the aid of an estimation model ME taking account both of the gravitational forces and of the thrust.

By way of reminder, Kalman filtering comprises a first prediction phase, in which the state vector at the time $t_k$ and its covariance matrix are estimated on the basis solely of the data available at the time $t_{k-1}$, followed by a correction phase utilizing the measurement of an observable at the time $t_k$. The equations of the Kalman filter are given by:

Prediction Phase:

$$\hat{\xi}_{k|k-1} = F_{k-1}\hat{\xi}_{k-1|k-1} + B_{k-1}u_{k-1}$$

$$P_{k|k-1} = F_{k-1}P_{k-1|k-1}F_{k-1}^T + Q_k$$

Correction Phase:

$$\tilde{y}_k = z_k + H_k\hat{\xi}_{k|k-1}$$

$$S_k = H_k P_{k|k-1} H_k^T + R_k$$

$$K_k = P_{k|k-1} H_k^T S_k^{-1}$$

$$\hat{\xi}_{k|k} = \hat{\xi}_{k|k-1} + K_k \tilde{y}_k$$

$$P_{k|k} = (I - K_k H_k) P_{k|k-1}$$

where:
  The exponent "$T$" indicates the transposition operation, the exponent "$-1$" the inversion of a matrix;
  The symbols in bold denote matrices;
  $\hat{\xi}_{k|k-1}$ is the a priori state estimation;
  $P_{k|k-1}$ is the a priori estimation covariance;
  $F_{k-1}$ (resp. $F_k$) is the state transition matrix at the time $t_{k-1}$ (resp. $t_k$);
  $B_{k-1}$ is the control matrix;
  $u_{k-1}$ is a control vector;
  $z_k$ is the result of measuring the observable at the time $t_k$;
  $\tilde{y}_k$ is the innovation;
  $S_k$ is the covariance matrix of the innovation;
  $H_k$ is the measurement matrix;
  $K_k$ is the optimal Kalman gain;
  $\hat{\xi}_{k|k}$ and $P_{k|k}$ are, respectively, the state estimation and the a posteriori estimation covariance;
  $Q_k$ and $R_k$ are noise.

Hereinafter it will be considered that the control vector u is identically zero.

The state vector $\xi$ comprises at least position and velocity parameters, as well as one or more thrust error parameters, characterizing a discrepancy between an actual thrust force acting on the space vehicle and a nominal thrust force. Advantageously, it can also comprise one or more parameters characterizing an error of the clock onboard the GNSS receiver. By way of nonlimiting specific example, it is possible to have:

$$\xi = [x; y; z; v_x; v_y; v_z; h_0; h_1; G_0; de; da]^T$$

where:
  x, y, z are the coordinates of the centre of mass of the space vehicle in an ECI frame of reference (see FIG. 1), and $v_x$, $v_y$, $v_z$ the corresponding components of the velocity;
  $h_0$ and $h_1$ are, respectively, a bias and a drift of the clock of the receiver;
  $G_0$ is a thrust amplitude error;
  de and da, defined above with reference to FIG. 3, parameters which characterize the attitude error, and therefore the angular error of the thrust, when considering that the latter exhibits a fixed orientation with respect to the shell of the space vehicle.

It is readily understood that other representations of the state vector are possible. For example, the position can be defined by a Keplerian elliptic representation; the drift of the clock can sometimes be neglected; it is possible to introduce an amplitude error drift of the thrust, $G_1$; the angular parameters de and da can be replaced with three parameters representing a roll, pitch and yaw error.

On the basis of the state vector $\xi_{k-1}$ at a date $t_{k-1}$, the state vector $\xi_{k|k-1}$ is calculated by propagating the model of forces to the date $t_k = t_{k-1} + \Delta t$, taking for example $\Delta t = 30$ seconds. In practice, this means that knowing the position (necessary for evaluating the gravity forces—terrestrial, lunar and solar attraction), the thrust and the axis of the thrust (necessary for evaluating the thrust force), then the acceleration exerted on the satellite at $t_{k-1}$ is known and it is possible to deduce therefrom the variation of all the parameters:
  Position(k|k−1)=Position(k)+Velocity(k)−Δt
  Velocity(k/k−1)=Velocity(K)+Acceleration(k)−Δt $h_0(k|k-1)=h_0(k)$
$h_1(k|k-1)=h_1(k)$
$G_0(k|k-1)=G_0(k)$
$de(k|k-1)=de(k)$
$da(k|k-1)=da(k)$ It is therefore possible to construct the variation matrix ($F_{k-1}$ in the above formulae), in the form:

$$F_{k-1} = \begin{pmatrix} 1 & 0 & 0 & \Delta t & 0 & 0 & 0 & 0 & 0 & 0 & 0 \\ 0 & 1 & 0 & 0 & \Delta t & 0 & 0 & 0 & 0 & 0 & 0 \\ 0 & 0 & 1 & 0 & 0 & \Delta t & 0 & 0 & 0 & 0 & 0 \\ A_1 & A_2 & A_3 & 1 & 0 & 0 & 0 & 0 & A_4 & A_5 & A_6 \\ A_7 & A_8 & A_9 & 0 & 1 & 0 & 0 & 0 & A_{10} & A_{11} & A_{12} \\ A_{13} & A_{14} & A_{15} & 0 & 0 & 1 & 0 & 0 & A_{16} & A_{17} & A_{18} \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{pmatrix}$$

The values from $A_1$ to $A_{18}$ equal $\Delta t$ multiplied by the partial derivatives of the acceleration with respect to the position elements and to the thrust elements. For example $$A_1 = \Delta t \frac{\partial \ddot{x}}{\partial x}\bigg|_{t_k}$$

where $\ddot{x}$ is the component of the acceleration along the x axis.

In practice, if the interval $\Delta t$ is too large for the position, the velocity and the acceleration to be considered constant, it is possible to use integration procedures of Runge-Kutta type.

It will be noted that the equations of motion are non-linear, since the gravitational forces depend on position. However, in the model hereinabove the equations are linearized and the non-linearity is manifested by the fact that the matrix F is not constant but changes from one propagation increment to the next. Likewise, the effect of the thrust is integrated into the matrix F, thereby making it possible to avoid the use of a control vector u.

It is beneficial to note that the attitude of the satellite comes into the state transition matrix by way of the thrust. This means that an attitude variation is manifested by a variation of position. The position being observable through the pseudorange measurement (see hereinbelow), the attitude is therefore observable. The fact that the attitude has an influence on the position is directly manifested by the fact that the elements $A_5$, $A_6$, $A_{11}$, $A_{12}$, $A_{17}$ and $A_{18}$ in the matrix F are non-zero.

By virtue of the integration of the parameters de and da in the state vector it is therefore possible to continuously estimate the estimation error in $\hat{X}_{RS}$ and $\hat{Y}_{RS}$ and therefore to contribute to the satellite attitude estimation.

In the model of the Kalman filter, it is possible moreover to take into account the propagation error. The values of estimated error must be introduced into the matrix $Q_k$ of the formulae hereinabove. Indeed, it may be considered that the acceleration model exhibits an error (standard deviation) of $1 \cdot 10^{-7}$ m/s² in each direction, for example because, for the sake of simplicity, the effect of the lunar attraction has been ignored. In this case an error of $1 \cdot 10^{-7} \cdot \Delta t$ m/s=$3 \cdot 10^{-6}$ m/s in the propagated velocity will be made by taking $\Delta t$=30 s. Thus, considering there to be no other error, we have:

$$Q_k = (3 \cdot 10^{-6})^2 \cdot \begin{pmatrix} 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 1 & 0 & 0 & 0 & 0 & 0 & 0 & 0 \\ 0 & 0 & 0 & 0 & 1 & 0 & 0 & 0 & 0 & 0 & 0 \\ 0 & 0 & 0 & 0 & 0 & 1 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \end{pmatrix}$$

the square being due to the fact that $Q_k$ is a matrix of variances and not of standard deviations.

In the Kalman equations, a measurement $z_k$ is used to calculate the innovation $\tilde{y}_k$ as being the discrepancy between the expected measurement, dependent on $\hat{\xi}_{k|k-1}$, and the measurement actually performed. In the case of GNSS, the measurement concerned is a pseudorange measurement. By considering the coordinates ($X_{SAT}$, $Y_{SAT}$, $Z_{SAT}$) of the GNSS satellite at the moment of the transmission of the signal at the date $t_E$ (true date), and $t_R$ being the date of reception determined by the receiver, the pseudorange PD is given by:

$$PD = t_R - t_E$$
$$= \frac{\sqrt{(x-x_{SAT})^2 + (y-y_{SAT})^2 + (z-Z_{SAT})^2}}{c} + h$$

h being the error of the onboard clock ($h=h_0+h-t_k$ adopting the state vector defined previously) and c the velocity of light. The innovation $\tilde{y}_k$ is the difference between the pseudorange actually measured and that expected at the date $t_k$:

$$y_k = PD - \left[ \frac{\sqrt{(x_{k|k-1}-x_{SAT})^2 + (y_{k|k-1}-y_{SAT})^2 + (z_{k|k+1}-z_{SAT})^2}}{c} + h_{k|k-1} \right]$$

Only the parameters which have an impact on the pseudorange are directly observable, namely the clock error and the position. According to an advantageous aspect of the invention, it is possible to optimize the trajectory to contrive matters so that the thrust has a strong—although indirect—influence on the pseudorange measurement.

For simplicity, it is assumed that the GNSS satellite SAT is situated at the centre of the Earth, $O_T$, and that the space vehicle VS is situated at a position (0, 0, z) in the ETI frame of reference; thus, the matrix $H_k$ (in fact, a row vector which, multiplied on the right by $\hat{\xi}_{k|k-1}$ gives a scalar) equals:

$$H_k = [0,0,1/c,0,0,0,1,0,0,0,0]$$

Indeed, pseudorange varies in proportion to the clock and as 1/c with respect to the z direction, the other elements not having any impact.

A thrust along the axis $X_{ROL}$ has an impact on the velocity $v_x$ and then, at sufficient iteration, on the position x, but this does not have any impact on the pseudorange measurement, since the direction $X_{ROL}$ is orthogonal to the axis linking the GNSS satellite to the space vehicle (parallel to $Z_{ROL}$). Consequently, to reduce the residual between the actual measurement and the estimated measurement, the Kalman filter will correct by priority the clock error parameter and the estimations of z and of $v_z$, that is to say the elements which have an impact on the measurement, to the detriment of the other elements of the state vector, notably the thrust.

If on the other hand the attitude of the space vehicle is modified so that the thrust is temporarily oriented along the axis $Z_{ROL}$, then the thrust has a large influence on the pseudorange measurement, and the Kalman filter will correct the estimations of z and of $v_z$, of the thrust errors (angular error expressed by de and da and amplitude error $G_0$), as well as the clock error parameter.

Stated otherwise, by choosing the thrust axis, the observability of the state vector thrust estimation is improved.

From a mathematical point of view, this is manifested in the following manner:

In the absence of support for the measurement on a variable, its covariance (the row which corresponds to it in the matrix P) increases more quickly during the propagation step (which causes it to switch from $P_{k-1}$ to $P_{k|k-1}$) than it decreases during the measurement correction (which causes it to switch from $P_{k|k-1}$ to $P_k$). This manifests an increasing uncertainty for the filter regarding this value.

On the other hand, if the support for the measurement is strong, a strong decrease is observed in the switch from $P_{k|k-1}$ to $P_k$, in particular greater than the increase between $P_{k-1}$ to $P_{k|k-1}$; therefore, overall, the uncertainty is reduced between $t_{k-1}$ and $t_k$.

The fact of choosing the thrust axis not only as a function of the desired direction in relation to the orbital transfer, but also as a function of what this allows as observability, and doing so notably in the cases where the rows corresponding to the thrust were seen to increase strongly in the matrix P, is represented schematically in FIG. 4 by the block "GNSS measurement strategy" (reference c).

It is known from Kalman filtering theory that the state vector 4 cannot be too complex for fear of encountering invertibility problems. This compels an excessive simplification in the modelling of the motion of the space vehicle. For example, the thrust amplitude error g is modelled by an offset, or indeed by an offset and a linear drift; but a more realistic model would be:

$$g(t) = g_0 + g_1 \cdot \sin(g_2 \cdot t + g_3)$$

involving four parameters $g_0$, $g_1$, $g_2$ and $g_3$.

To surmount this difficulty, recourse may be had to a "loopback to the past" (reference d in FIG. 4).

For example, the case is considered where the state vector comprises a single constant parameter $g(t)=G_0$ modelling the thrust amplitude error whereas, as shown hereinabove, four parameters would be necessary. We have:

$g(t_{k-1}) = g_0 + g_1 \cdot \sin(g_2 \cdot t_{k-1} + g_3)$
$g(t_k) = g_0 + g_1 \cdot \sin(g_2 \cdot t_k + g_3)$
Putting $t_k = t_{k-1} + \Delta t$:
$g(t_k) = g_0 + g_1 \cdot \sin[g_2 \cdot (t_{k-1} + \Delta t) + g_3]$
which, after expanding the sine and simplifying to order 1 and by considering $g_2 \cdot \Delta t$ small (stated otherwise the period of sinusoidal variation is much larger than $\Delta t$), i.e. $\cos(g_2 \cdot \Delta t) = 1$ and $\sin(g_2 \cdot \Delta t) = 0$, gives:
$g(t_k) = g(t_{k-1}) + g_1 \cdot g_2 \cdot \Delta t \cdot \cos(g_2 \cdot \Delta t + g_3)$ Stated otherwise:
Having correctly estimated $G_0 = g(t_{k-1}) = g_0 + g_1 \cdot \sin(g_2 \cdot t_{k-1} + g_3)$ at the date $t_{k-1}$,
And propagating by $g(t_k) = G_0$,
We introduce an error of $\Delta G_0 = g_1 \cdot g_2 \cdot \Delta t \cdot \cos(g_2 \cdot t_{k-1} + g_3)$ in the propagation.

Thus if, instead of working point after point with a Kalman filter, we estimate in one go, for example by a least squares estimation over the past day (24 hours), a much more complex state vector, integrating for its part $g_0$, $g_1$, $g_2$, $g_3$ as well as the equivalent parameters in the attitude and clock error, this least squares estimator does not exhibit any convergence problem since we consider many more measurements than parameters. If a measurement thereof is performed every $\Delta t = 30$ s, we have $24 \cdot 3600/30 = 2880$ measurements for, for example, 32 parameters (11 parameters defining the state vector and harmonic models—each introducing three additional parameters—for the thrust amplitude error, the clock error, the two components of the angular error of the thrust, the three acceleration components).

After this least squares estimation, it may be considered that these parameters are known for the following day. Thus, by limiting ourselves to the case of the thrust amplitude error, in the following day, during the application of the Kalman filter, the value $(\Delta G_0)^2 = (g_1 \cdot g_2 \cdot \Delta t \cdot \cos(g_2 \cdot t_{k-1} + g_3))^2$ will be added to the ninth row/ninth column of the covariance matrix $Q_k$ of the model.

Stated otherwise, the "loopback over the past" consists in using previously determined pseudoranges (for example, in the course of a past day) as well as the corresponding estimations of the state vector, to update a covariance matrix of the estimation model. This updated matrix will thereafter be used—for example in the course of a following day—for the implementation of the Kalman filtering.

When a GNSS measurement is carried out, the following elements are known:
Position of the GNSS satellite (by its ephemerides, necessary in order to transform the arrival time measurement into a useful pseudorange);
Position of the space vehicle (Kalman state vector);
Power of the GNSS signal received, evaluated by conventional GNSS processing procedures.

These elements may advantageously be used to estimate the gain of the radiation pattern DG of the transmitting antenna of the GNSS satellite in the satellite-space vehicle direction.

Indeed, the knowledge of the position of the GNSS satellite "SAT" and of the space vehicle "VS" makes it possible to determine an angle of elevation of VS seen by SAT and of SAT seen by VS, as well as the distance SAT-VS. This makes it possible in its turn to determine the link budget, only the antenna gain of the GNSS satellite being unknown. The latter parameter can be determined on the basis of a measurement of the power of the GNSS signal received.

The estimation of this antenna gain (reference "e" in FIG. 4) can advantageously be used to optimize the GNSS tracking strategy (reference "f").

Indeed, the onboard GNSS receiver knows its own position (estimated by the Kalman filter), the position of the Earth and the position of all the GNSS satellites. It can therefore calculate for each of these GNSS satellites the corresponding angle of elevation and, on the basis of the antenna pattern estimated in the manner described hereinabove, decide whether or not the GNSS satellite is usable, and therefore decide whether or not to carry out a reacquisition and a measurement of pseudorange on the latter.

Advantageously, the knowledge of the estimation model and of the state parameters of the vector ξ can be utilized to determine future corrections of the orbit and/or of the thrust of the said space vehicle. For example:

Knowing the effective thrust curve, it will be possible to best distribute the thrust over the remainder of the manoeuvre for placing the satellite on station, for example by limiting the off-perigee thrusts.

Knowing the precise antenna pattern of each GNSS satellite, it will be possible to choose a priori the GNSS satellites followed at each measurement point in a more effective manner, and it will be possible to determine more precisely the associated measurement covariance.

Knowing the current position of the space vehicle, and by comparing it with the position expected during the initial construction of the scenario, we will know what additional trajectory correction must be afforded so as to readjust the final orbit as provided for; this relates in particular to the inclination and the nodal longitude.

This step of "optimization over the future" is indicated in FIG. 4 by the reference "g".

Figure 5:
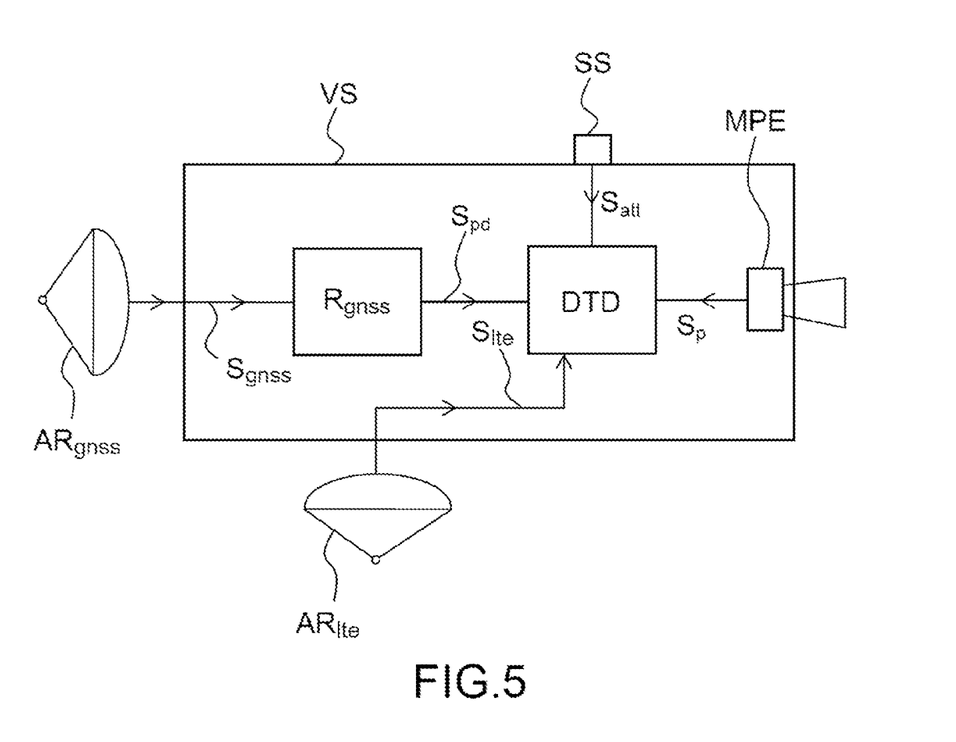
FIG. 5 is a functional chart of an apparatus according to an embodiment of the invention.

FIG. 5 illustrates a space vehicle VS carrying a device for implementing a method according to the invention. The space vehicle is equipped with a first antenna $AR_{gnss}$ to t receive at least one GNSS signal $s_{gnss}$, and with a second antenna $AR_{lte}$ to receive, from the ground, at least one signal $s_{lte}$ representative of the long-term ephemerides of the GNSS satellites and a star tracker SS to generate a signal $s_{att}$ representative of the attitude of the satellite. In other embodiments, a single antenna can acquire the GNSS signals and long-term ephemeride signals and/or other means, such as control wheels, can be provided for the estimation of the attitude.

The signal or signals $s_{gnss}$ picked up by the antenna $AR_{gnss}$ are provided as input to a GNSS receiver (reference $R_{gnss}$) which, by a conventional processing, determines the corresponding pseudoranges (possibly ambiguous). A device for processing the data DTD, typically an onboard computer programmed in an opportune manner, receives as input signals $s_{pd}$ generated by the receiver $R_{gnss}$, the signal $s_{lte}$, the signal $s_{att}$ as well as a signal $s_p$ representative of a thrust generated by an electric propulsion motor MPE. The device DTD uses these input data, as well as an estimation model ME, to determine (among other things) the instantaneous position and instantaneous velocity of the space vehicle. These data can be sent to a ground station, for example by means of a dedicated antenna (not represented) or of the antenna $AR_{lte}$.

The invention has been described with reference to a particular embodiment, but numerous modifications are conceivable. For example, the Kalman filter can be replaced with another estimation model such as an extended Kalman filter, a genetic algorithm or an iterative least square.

The invention claimed is:

1. A method of following a transfer orbit or a phase of orbital placement of a space vehicle, the phase of orbital placement of a space vehicle being performed using a continuous thrust, the method comprising the following steps:

tracking at least one Global Navigation Satellite System (GNSS) signal and using the at least one GNSS signal to determine at least one pseudorange between said space vehicle and one or more GNSS satellites transmitting said at least one GNSS signal;

using an estimation model to jointly estimate a set of state parameters of said space vehicle, the set of state parameters comprising:

a plurality of position parameters,
a plurality of velocity parameters,
at least one clock parameter, and
at least two continuous thrust error parameters, each of the at least two continuous thrust error parameters characterizing a discrepancy between a direction of an actual continuous thrust force of said space vehicle and a nominal continuous thrust force, and, at one and the same time, an error of estimation of an attitude of said space vehicle,
wherein the using the estimation model includes taking said at least one pseudorange as an input of said estimation model, and said actual continuous thrust force is of an electric type; and applying, for a determined duration, a thrust nominally directed along a direction linking said space vehicle to a GNSS satellite transmitting the GNSS signal tracked during said tracking step.

2. The method according to claim 1, wherein said tracking step comprises recovering a navigation message of the one or more GNSS satellites by assistance from a ground station.

3. The method according to claim 2, wherein said tracking step comprises tracking at least one pilot GNSS signal and not transmitting any navigation message, said tracking of at least one pilot GNSS signal being carried out by a coherent correlation of said at least one pilot GNSS signal.

4. The method according to claim 2, wherein said tracking step comprises erasing said navigation message recovered by assistance from the ground station.

5. The method according to claim 1, wherein said set of state parameters further comprises at least one clock error parameter, characterizing an offset or a drift of a clock of a GNSS receiver onboard said space vehicle and used to implement said tracking step.

6. The method according to claim 1, wherein said estimation model is a Kalman filter or an extended Kalman filter characterized by a transition matrix or function depending on time and on the position of said space vehicle so as to take into account the gravitational forces acting on said space vehicle and a thrust force.

7. The method according to claim 1, further comprising the following step of using said estimation model and said state parameters to determine corrections of an orbit and/or the thrust of said space vehicle subsequent to an initial determination of orbit and thrust.

8. A method of following a transfer orbit or a phase of orbital placement of a space vehicle, the method comprising the following steps:

tracking at least one Global Navigation Satellite System (GNSS) signal and using the at least one GNSS signal to determine at least one pseudorange between said space vehicle and one or more GNSS satellites transmitting said at least one GNSS signal;

using pseudoranges measured in the past, as well as corresponding estimations of state parameters, to update a covariance matrix of an estimation model;

using the estimation model to jointly estimate a set of state parameters of said space vehicle, the set of state parameters comprising:

a plurality of position parameters,
a plurality of velocity parameters,
at least one clock parameter,
an error of estimation of an attitude of said space vehicle, and
at least two continuous thrust error parameters, each of the at least two continuous thrust error parameters characterizing a discrepancy between a direction of an actual continuous thrust force of said space vehicle and a nominal continuous thrust force, and, at one and the same time, an error of estimation of an attitude of said space vehicle, wherein the using the estimation model includes taking said at least one pseudorange as an input of said estimation model, and said actual continuous thrust force is of an electric type; and applying, for a determined duration, a thrust nominally directed along a direction linking said space vehicle to a GNSS satellite transmitting the GNSS signal tracked during said tracking step.

9. The method according to claim 8, wherein said tracking step comprises recovering a navigation message of the one or more GNSS satellites by assistance from a ground station.

10. The method according to claim 9, wherein said tracking step comprises tracking at least one pilot GNSS signal and not transmitting any navigation message, said tracking of said at least one pilot GNSS signal being carried out by a coherent correlation of said at least one pilot GNSS signal.

11. The method according to claim 9, wherein said tracking step comprises erasing said navigation message recovered by assistance from the ground station.

12. The method according to claim 8, wherein said set of state parameters further comprises at least one clock error parameter, characterizing an offset or a drift of a clock of a GNSS receiver onboard said space vehicle and used to implement said tracking step.

13. The method according to claim 8, wherein said estimation model is a Kalman filter or an extended Kalman filter characterized by a transition matrix or function depending on time and on the position of said space vehicle so as to take into account the gravitational forces acting on said space vehicle and a thrust force.

14. The method according to claim 8, further comprising using said estimation model and said state parameters to determine corrections of an orbit and/or a thrust of said space vehicle subsequent to an initial determination of orbit and thrust.

15. A method of following a transfer orbit or a phase of orbital placement of a space vehicle, the method comprising the following steps:

tracking at least one Global Navigation Satellite System (GNSS) signal and using the at least one GNSS signal to determine at least one pseudorange between said space vehicle and one or more GNSS satellites transmitting said at least one GNSS signal;

using an estimation model to jointly estimate a set of state parameters of said space vehicle, the set of state parameters comprising:
a plurality of position parameters,
a plurality of velocity parameters,
at least one clock parameter,
an error of estimation of an attitude of said space vehicle, and
at least two continuous thrust error parameters, each of the at least two continuous thrust error parameters characterizing a discrepancy between a direction of an actual continuous thrust force of said space vehicle and a nominal continuous thrust force, and, at one and the same time, an error of estimation of an attitude of said space vehicle, wherein the using the estimation model includes taking said at least one pseudorange as an input of said estimation model, and said actual continuous thrust force is of an electric type;

using said at least one GNSS signal, an ephemerides of a GNSS satellite that transmitted the GNSS signal, and a position of the space vehicle estimated by means of said estimation model to estimate a radiation pattern of a transmitting antenna of said GNSS satellite; and applying, for a determined duration, a thrust nominally directed along a direction linking said space vehicle to a GNSS satellite transmitting the GNSS signal tracked during said tracking step.

16. The method according to claim 15, further comprising the following step of using an estimation of a radiation pattern during the implementation of said tracking step.

17. The method according to claim 15, wherein said tracking step comprises recovering of a navigation message of the one or more GNSS satellites by assistance from a ground station.

18. The method according to claim 17, wherein said tracking step comprises tracking at least one pilot GNSS signal and not transmitting any navigation message, said tracking of said at least one GNSS signal being carried out by a coherent correlation of said at least one pilot GNSS signal.

19. The method according to claim 17, wherein said tracking step comprises erasing said or each said navigation message recovered by assistance from the ground station.

20. The method according to claim 15, wherein said set of state parameters further comprises at least one clock error parameter, characterizing an offset or a drift of a clock of a GNSS receiver onboard said space vehicle and used to implement said tracking step.

21. The method according to claim 15, wherein said estimation model is a Kalman filter or an extended Kalman filter characterized by a transition matrix or function depending on time and on the position of said space vehicle so as to take into account the gravitational forces acting on said space vehicle and a thrust force.

22. The method according to claim 15, further comprising using said estimation model and said state parameters to determine corrections of an orbit and/or a thrust of said space vehicle subsequent to an initial determination of orbit and thrust.

23. An apparatus for following a transfer orbit or a phase of orbital placement of a space vehicle, the phase of orbital placement of a space vehicle being performed using a continuous thrust, the apparatus comprising:

a Global Navigation Satellite System (GNSS) receiver configured to track at least one GNSS signal; and a device configured to receive the at least one GNSS signal tracked by said receiver, said device further configured to:

use said at least GNSS signal to determine at least one pseudorange between said receiver and one or more GNSS satellites transmitting said at least one signal;

apply an estimation model to jointly estimate a set of state parameters, the set of parameters comprising:
a plurality of position parameters,
a plurality of velocity parameters,
at least one clock parameter, and
at least two continuous thrust error parameters, each of the at least two continuous thrust error parameters characterizing a discrepancy between a direction of an actual continuous thrust force of said space vehicle and a nominal continuous thrust force, and at one and the same time, an error of estimation of an attitude of said space vehicle, wherein the applying an estimation model includes taking said at least one pseudorange as input of said estimation model, and said actual continuous thrust force is of an electric type; and apply, for a determined duration, a thrust nominally directed along a direction linking said space vehicle to a GNSS satellite transmitting the GNSS signal tracked by said receiver.

24. An apparatus for following a transfer orbit or a phase of orbital placement of a space vehicle, the apparatus comprising:

a Global Navigation Satellite System (GNSS) receiver configured to track at least one GNSS signal;

a device configured to receive a GNSS signal tracked by said receiver, said device further configured to:

use said at least one GNSS signal to determine at least one pseudorange between said receiver and one or more GNSS satellites transmitting said at least one GNSS signal;

use pseudoranges measured in the past, as well as the corresponding estimations of said state parameters, to update a covariance matrix of an estimation model;

apply the estimation model to jointly estimate a set of state parameters, the set of state parameters comprising:

a plurality of position parameters, a plurality of velocity parameters, at least one clock parameter, and at least two continuous thrust error parameters, each of the at least two continuous thrust error parameters characterizing a discrepancy between a direction of an actual continuous thrust force of said space vehicle and a nominal continuous thrust force, and, at one and the same time, an error of estimation of an attitude of said space vehicle, wherein the applying the estimation model includes taking said at least one pseudorange as input of said estimation model, and said actual continuous thrust force is of an electric type; and apply, for a determined duration, a thrust nominally directed along a direction linking said space vehicle to a GNSS satellite transmitting the GNSS signal tracked by said receiver.

25. An apparatus for following a transfer orbit or a phase of orbital placement of a space vehicle, the apparatus comprising:

a Global Navigation Satellite System (GNSS) receiver configured to track at least one GNSS signal;

a device configured to receive a GNSS signal tracked by said receiver, said device further configured to:

use said at least one GNSS signal to determine at least one pseudorange between said receiver and one or more GNSS satellites transmitting said at least one GNSS signal;

apply an estimation model to jointly estimate a set of state parameters, the set of state parameters comprising:

a plurality of position parameters, a plurality of velocity parameters, at least one clock parameter, and at least two continuous thrust error parameters, each of the at least two continuous thrust error parameters characterizing a discrepancy between a direction of an actual continuous thrust force of said space vehicle and a nominal continuous thrust force, and, at one and the same time, an error of estimation of an attitude of said space vehicle, wherein the applying the estimation model includes taking said at least one pseudorange as input of said estimation model, and said actual continuous thrust force is of an electric type;

use said at least one GNSS signal, an ephemerides of a GNSS satellite that transmitted the at least one GNSS signal, and a position of the space vehicle estimated by means of said estimation model to estimate a radiation pattern of a transmitting antenna of said GNSS satellite; and apply, for a determined duration, a thrust nominally directed along a direction linking said space vehicle to a GNSS satellite transmitting the GNSS signal tracked by said receiver.

26. The apparatus according to claim 25, wherein the device is further configured to use an estimation of a radiation pattern during the implementation of said tracking step.

* * * * *

UNITED STATES PATENT AND TRADEMARK OFFICE
CERTIFICATE OF CORRECTION

PATENT NO. : 10,054,449 B2
APPLICATION NO. : 14/633512
DATED : August 21, 2018
INVENTOR(S) : Thibaud Calmettes et al.

Page 1 of 1

It is certified that error appears in the above-identified patent and that said Letters Patent is hereby corrected as shown below:

In the Claims

In Line 24, Column 14, in Claim 19, "step comprises erasing said or each said navigation" should be -- step comprises erasing said navigation --.

Signed and Sealed this
Fourth Day of December, 2018

Andrei Iancu
*Director of the United States Patent and Trademark Office*